No. 704,258. Patented July 8, 1902.
J. G. HODGSON.
PROCESS OF CANNING FOOD PRODUCTS.
(Application filed June 28, 1901.)
(No Model.)
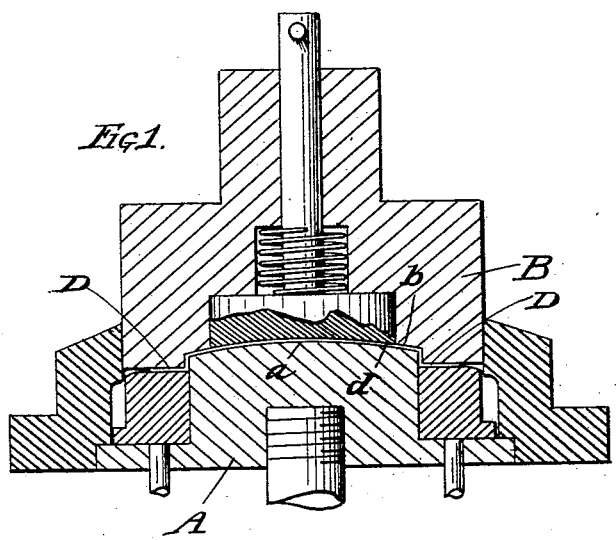
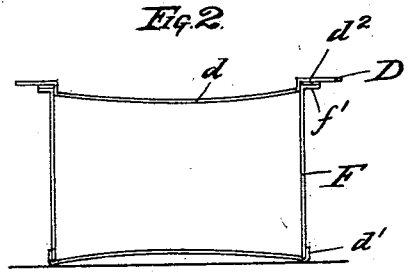
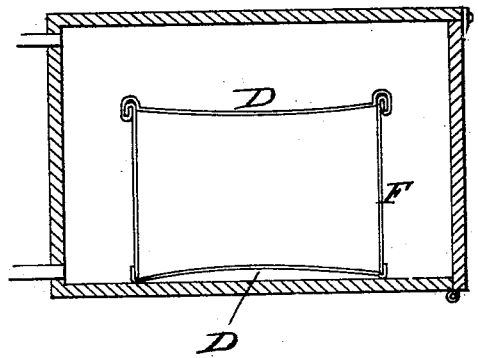
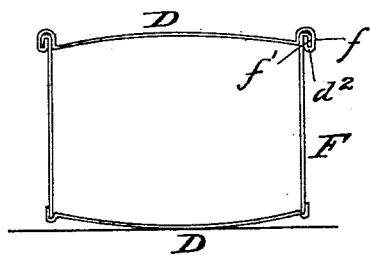
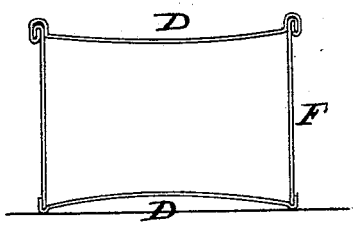
WITNESSES:
F. B. Townsend
W. W. Munday
INVENTOR.
John G. Hodgson.
BY Munday, Evarts & Adcock
ATTORNEYS

UNITED STATES PATENT OFFICE.

JOHN G. HODGSON, OF MAYWOOD, ILLINOIS, ASSIGNOR TO AUTOMATIC VACUUM CANNING COMPANY, OF CHICAGO, ILLINOIS, A CORPORATION OF ILLINOIS.

PROCESS OF CANNING FOOD PRODUCTS.

SPECIFICATION forming part of Letters Patent No. 704,258, dated July 8, 1902.

Application filed June 28, 1901. Serial No. 66,351. (No specimens.)

*To all whom it may concern:*

Be it known that I, JOHN G. HODGSON, a citizen of the United States, residing in Maywood, in the county of Cook and State of Illinois, have invented a new and useful Improvement in Processes of Canning Hermetically-Sealed Food Products, of which the following is a specification.

My invention relates to improvements in the art or process of canning hermetically-sealed and sterilized food products in tin cans or vessels having flexible heads or tops and bottoms.

Heretofore in the art of canning fruits, vegetables, fish, meat, and other food products requiring sterilization by heat it is customary to distinguish the spoiled cans or vessels from those which have been perfectly sealed or closed hermetically tight and in which the contents have been properly or effectually sterilized by examining the conditions of the flexible heads (tops and bottoms)—that is to say, whether they are inwardly curved or collapsed or outwardly bulged or swelled. In the former case the closure is perfect and the contents are effectually sterilized, while in the latter case the fermentation due to a leaky can or imperfect sterilization generates gases and internal pressure which outwardly bulges the flexible heads in the can or vessel. Such spoiled cans are commonly known or designated as "swell-heads." To cause the proper collapsing of the flexible heads and the retention of the same in this collapsed condition in the sound or perfect cans, the most common method heretofore employed, although other expedients have been used, is to hermetically seal or close the can by soldering up or otherwise closing a vent-hole or other opening while the can and its contents are at a high heat, 212° Fahrenheit, more or less, so that the partial vacuum produced by condensation of steam or vapors on the subsequent cooling of the can will enable the atmospheric pressure to inwardly curve or collapse the top and bottom heads of the can or vessel. This method or process frequently requires a second or further heating, cooking, or sterilizing step to insure sterilization of germs that may have impregnated the can or its contents at or during the soldering or final closing step, thus causing extra expense, time, and labor.

The object of my invention is to provide a simple and efficient method or process by which the necessity for hermetically sealing or closing the cans while the same and their contents are maintained at a high heat and by which the necessity of venting the cans or of subjecting the contents thereof to more than one cooking or sterilizing step may be avoided and by which also the cooking or sterilizing of the food may all take place after the can has been hermetically sealed or closed, while at the same time the spoiled and perfect cans can be readily distinguished from each other by the inwardly-curved or collapsed or outwardly-bulged or swelled position of their heads. I have discovered that this important and time, labor, and expense saving object or result may be practically and successfully accomplished by inwardly curving or collapsing the flexible top and bottom heads of the can or vessel before or at the time the same is hermetically sealed or closed, so that when the final opening in the can or vessel is sealed or closed the heads will occupy an inwardly-curved or collapsed position, this being preferably done while the contents of the can are cool and in a raw or uncooked condition. The top and bottom heads of the can may be thus inwardly curved or collapsed at any time prior to the final act of or instant of hermetically sealing the vessel. In practice, however, I prefer to thus inwardly curve or collapse the top and bottom heads of the can at the time the same are stamped up or formed and prior to the application of either head to the can-body. The same result, however, will be accomplished, as will be plain to those skilled in the art, by inwardly curving or collapsing the top and bottom heads of the can at the instant the can is hermetically sealed or closed. The top and bottom heads may be seamed or hermetically sealed or secured to the can-body by any suitable kind of hermetically-tight joint, preferably, however, by soldering or double-seaming.

In practicing my invention I first put the food products to be preserved in the can or vessel in a raw or uncooked condition and in a cold state, one of the heads of the can or vessel—the bottom head—being inwardly curved or collapsed. I next apply to the filled can an inwardly-curved or collapsed top head or cover and hermetically seal or close the can, this being preferably done by double-seaming the cover to the can-body. The hermetically-sealed can having inwardly-curved or collapsed top and bottom heads is next placed in a cooking retort or bath and the contents of the can properly cooked and sterilized, while the can remains hermetically closed. During this step or as soon as the hot can is removed from the cooking retort or bath the steam generated in the can by the heat causes its heads to outwardly bulge; but as the heads were inwardly-curved or collapsed when the can was closed or hermetically sealed its heads will again inwardly curve or collapse as soon as the can and its contents become cool. This enables the perfect cans to be readily distinguished from the fermented or spoiled ones or leaky or defective ones, whether the defect arises from imperfect sterilization or defective closure of the can.

By my improved method or process the food products are cooked in a raw state while hermetically sealed, so that the essence and nutriment of the food is preserved without loss.

In the accompanying drawings, forming a part of this specification, I have, to enable my invention to be more readily understood by those skilled in the art, illustrated a can in several successive steps of my process and have also illustrated the preferred way of producing the inward curving or collapsing of the heads of the can, so that the same will be in this condition when the can is finally closed or sealed.

In said drawings, Figure 1 represents a die which may be used for stamping up or forming the heads of the can with the required inward curve or collapsed shape. Fig. 2 represents the can after it has been filled and ready to be hermetically sealed or closed. Fig. 3 represents the filled can after it is hermetically sealed or closed and is placed in a cooking-retort to cook and sterilize its contents. Fig. 4 shows the hermetically-sealed can or vessel after its contents have been cooked and sterilized by heat and its heads outwardly bulged by the steam or internal pressure due to the heat. Fig. 5 shows the hermetically-sealed can after it and its contents have been cooled and its top and bottom heads inwardly curved or collapsed.

In the drawings, A B represent male and female stamping-dies, the central portions thereof having convex surfaces $a$ $b$ to give the heads D of the can F an inward curve or collapsed shape $d$.

As illustrated in the drawings, I have, for convenience, represented one of the heads, the bottom head, having the ordinary flange $d'$, secured to the can-body F by soldering and the other head, the top head or cover, as having a flange $d^2$, adapted to be secured to the can-body F by a double seam $f$, formed by folding the flange $d^2$ with the flange $f'$ of the can-body. If preferred, both heads may be of either type. After the can F is filled with the fish, meat, fruit, or vegetables to be preserved the top head or cover D is applied and hermetically sealed or secured to the can-body by any suitable form of hermetically-tight joint. At the time the can is thus hermetically sealed or closed the top and bottom heads are inwardly curved or collapsed, as indicated in Figs. 2 and 3, such inner curvature of the heads being either formed at the time the heads are stamped up or subsequently. The can being thus hermetically sealed and having inwardly-curved heads is next subjected to heat and its contents properly cooked and sterilized, as illustrated in Fig. 3. It is then removed from the cooking bath or retort and the heads D D outwardly bulge from the internal pressure due to the heat and the steam generated thereby, as illustrated in Fig. 4. The cans are then cooled and the heads D D inwardly collapse, as illustrated in Fig. 5.

I prefer to give the heads the inwardly-curved or collapsed shape at the time the same are formed or stamped up by the dies, as in this way the heads are given a permanent set, so that they will retain their inwardly-curved shape while the can is being hermetically closed or sealed, whatever may be the way in which such closure is formed, whether by soldering, double-seaming, or otherwise.

I claim—

The process or method of producing hermetically-sealed and sterilized can goods having inwardly-curved or collapsed heads, consisting in first putting the goods to be preserved in a can having an inwardly-curved head, then applying and double-seaming an inwardly-curved final head to the can-body, and then cooking and sterilizing, substantially as specified.

JOHN G. HODGSON.

Witnesses:
H. M. MUNDAY,
EDMUND ADCOCK.